(12) United States Patent
Gammel et al.

(10) Patent No.: US 7,694,156 B2
(45) Date of Patent: Apr. 6, 2010

(54) CRYPTOGRAPHIC UNIT AND METHOD FOR OPERATING A CRYTOGRAPHIC UNIT

(75) Inventors: Berndt Gammel, Markt Schwaben (DE); Holger Bock, Graz (AT); Michael Goessel, Mahlow (DE)

(73) Assignee: Infineon Technologies AG, Neubiberg (DE)

( * ) Notice: Subject to any disclaimer, the term of this patent is extended or adjusted under 35 U.S.C. 154(b) by 1069 days.

(21) Appl. No.: 11/318,061

(22) Filed: Dec. 23, 2005

(65) Prior Publication Data
US 2007/0189536 A1 Aug. 16, 2007

(30) Foreign Application Priority Data
Dec. 27, 2004 (DE) .................. 10 2004 062 825

(51) Int. Cl.
G06F 11/30 (2006.01)
(52) U.S. Cl. .................. 713/194; 713/161; 380/203; 380/259
(58) Field of Classification Search .................. 713/194, 713/193, 794, 161; 380/1, 2, 203–210, 250, 380/259, 293; 714/100, 48–54, 746, 799
See application file for complete search history.

(56) References Cited

U.S. PATENT DOCUMENTS

| 5,432,848 A | 7/1995 | Butter et al. | |
|---|---|---|---|
| 2005/0050340 A1* | 3/2005 | Lee | 713/189 |
| 2005/0135607 A1* | 6/2005 | Lee et al. | 380/28 |
| 2005/0213756 A1* | 9/2005 | Hubert | 380/44 |
| 2006/0147040 A1* | 7/2006 | Lee et al. | 380/28 |

FOREIGN PATENT DOCUMENTS

| DE | 102 61 810 A1 | 7/2004 |
|---|---|---|
| DE | 103 09 255 A1 | 9/2004 |

OTHER PUBLICATIONS

Ramesh Karri, Kaijie Wu, Piyush Mishra, Fault-bades Side-Channel Cryptanalysis Tolerant Rijndael sysmmetric block cipher architecture, IEEE international sysmposium, 2001.*
Guido Bertoni, Luca Breveglieri, Israel Koren, Erro analysis and detection procedures for a hardware implementation of the advanced encdryption standard. IEEE, 2003.*

(Continued)

*Primary Examiner*—Emmanuel L Moise
*Assistant Examiner*—Abu Sholeman
(74) *Attorney, Agent, or Firm*—Dickstein, Shapiro, LLP.

(57) ABSTRACT

A cryptographic unit includes a first processing unit for determining an output signal on the basis of the AES algorithm and for determining a first comparison signal, a second processing unit for determining a second comparison signal, and a release unit for providing the output signal, wherein the release unit is designed to perform a defense measure against an external tapping of the output signal when the first comparison signal is not related to the second comparison signal in a predetermined relationship. The first comparison signal is determined in a different way as compared to the second comparison signal, so that, in the case of the injection of faults into the cryptographic unit, these faults may be detected very easily.

22 Claims, 7 Drawing Sheets

OTHER PUBLICATIONS

Ramesh et al, Concurrent Error Detection schemes for fault -based side-channel cryptanalysis of symmetric Block-Ciphers, Dec. 2002, IEEE, vol. 21,No. 12.*

Bertoni et al., "Error Analysis and Detection Procedures for a Hardware Implementation of the Advanced Encryption Standard", IEEE Transactions on Computers, vol. 52, No. 4, pp. 1-14 (Apr. 2003).

Daemen et al., "AES Proposal: Rijndael", The Rijndel Block Cipher, pp. 1-45 (Mar. 1999).

Wu et al., "Low Cost Concurrent Error Detection for the Advanced Encryption Standard", Polytechnic University, Department of Electrical and Computer Engineering, Brooklyn, NY and University of Potsdam, Institute of Computer Science, Potsdam, Germany.

Christophe Giraud, "DFA on AES", Oberthur Card Systems, Puteaux, France, c.giraud@oberthurcs.com.

Biham et al., "Differential Fault Analysis of Secret Key Cryptosystems", Computer Science Department, Haifa, Israel, biham@cs,technion.ac.il and Applied Mathematics and Computer Science Department, Rehovot, Israel, shamir@wisdom.weizmann.ac.il (1998).

Bertoni et al., "On the Propagation of Faults and their Dectection in a Hardward Implementation of the Advanced Encryption Standard", IEEE International Conference on Application-Specific Systems, Architectures and Processors, pp. 303-312 (2002).

Graf et al., "Fehlererkennungs-schaltungen", R. Oldenbourg, Verlag, pp. 10-12 and 48-52 (Munchen, Germany (1987).

Karpovsky et al., "Robust Protection against Fault-Injectioon Attacks on Smart Cards Implementing the Advanced Encryption Standard", 2004 International Conference on Dependable Systems and Networks, pp. 93-101 (2004).

German Office Action dated Feb. 24, 2006.

* cited by examiner

CRYPTOGRAPHIC UNIT AND METHOD FOR OPERATING A CRYTOGRAPHIC UNIT

CROSS-REFERENCE TO RELATED APPLICATION

This application claims priority from German Patent Application No. 10 2004 062 825.4, which was filed on Dec. 27, 2004, and is incorporated herein by reference in its entirety.

BACKGROUND OF THE INVENTION

1. Field of the Invention

The present invention relates to the technical field of cryptography and the present invention particularly refers to the detection of so called fault attacks of cryptographic units.

2. Description of the Related Art

So-called fault attacks (FA) represent a serious threat for the implementation of cryptographic algorithms, irrespective of whether the algorithm is implemented in software or as hardware module.

While asymmetric methods, such as RSA, may be protected in a relatively simple way by well-known published measures, it is extremely difficult to protect symmetric encryption methods, such as the advanced encryption standard (AES) or the DES (data encryption standard). With simple technical means, an attacker is capable of disturbing the algorithm during the processing so that, for example, internal intermediate results (for example round keys or intermediate results of rounds) comprise one bit faults or multiple bit faults. These faults result in wrong encryption or decryption results. In a cryptographic analysis, the secret key may be calculated from only a small number of such results. For this, it is not even necessary to inject the bit faults at specific positions.

According to a publication by Giraud ("Differential Fault Analysis On AES", Eprint IACR 2003-008, http://eprint.iacr.org/2003/008.ps), as little as 50 wrong results are sufficient for one bit faults in intermediate results of the ninth round of AES 128, or about 250 wrong results are sufficient for byte faults in round keys of the eighth or ninth round or in intermediate results of the ninth round.

In the case of one bit faults, an efficient method of online fault detection is known (see for example Wu, Karri, Kusnetsov, Gössel, Low Cost Concurrent Error Detection for the Advanced Encryption Standard, Preprint 0 08/2003, Oct. 2003, ISSN 0946-7580, University of Potsdam, or Gössel, German Patent Application DE 10261810.0: "Verfahren zur Fehlererkennung beim kryptographischen Transformieren von binären Daten und Schaltungsanordnung"; or Bretoni, Breveglieri, Korem, Piuri, "On the propagation of faults and their detection in a hardware implementation of the advanced encryption standard", Proc. ASAP'02, pp. 303-312, 2002). If, however, a higher security level is necessary, the occurrence of any multiple bit faults has to be detected. Thus, there are no general solutions known today for the case of injected multiple bit faults except trivial redundancy as:

a) multiple repetition of the encryption (or decryption) and comparison of the results (time redundancy).

The latter may also be implemented for example as an encryption with subsequent decryption and comparison of the result with the output data for making the attack more difficult. In any case, this method results approximately in halving the data throughput. In order to diminish this disadvantage, only the last or the last two rounds may be calculated (or calculated back) repeatedly, for example, because in this attack (for example according to the above publication by Giraud from the year 2003) faults in these rounds may be used. However, one cannot rule out in this case that more sophisticated cryptographic analysis methods may be successful even here.

b) Multiple implementation with comparison of the results (information redundancy).

However, the double implementation, for example, requires a high hardware effort and still contains security gaps, because in this case the comparison may, for example, also be a target of the attack. If injected faults in the comparator lead to the non-detection of the inequality of results, a wrong result may still be output. Furthermore, the identical duplication and the comparison have the weakness that the probability for "equal faults" in both data paths is not negligible and thus sufficiently faulty results are not detected and a successful attack becomes possible.

Fault detection in the AES algorithm may also be done, for example, by parity bits, which is, for example, known from the above publication by Bretoni et al. or Wu et al.

The fault detection by parity bits has the disadvantage that only an uneven number of faulty bits for which the parity is determined can be detected. As already mentioned, the basically simplest method for fault detection, which is well known to someone skilled in the art, is the duplication and comparison. By duplication and comparison, all faults are detected which involve either only the circuit to be monitored, the duplicated circuit or only the comparator. However, the effort for the duplication and the comparison is high.

Figure 6:
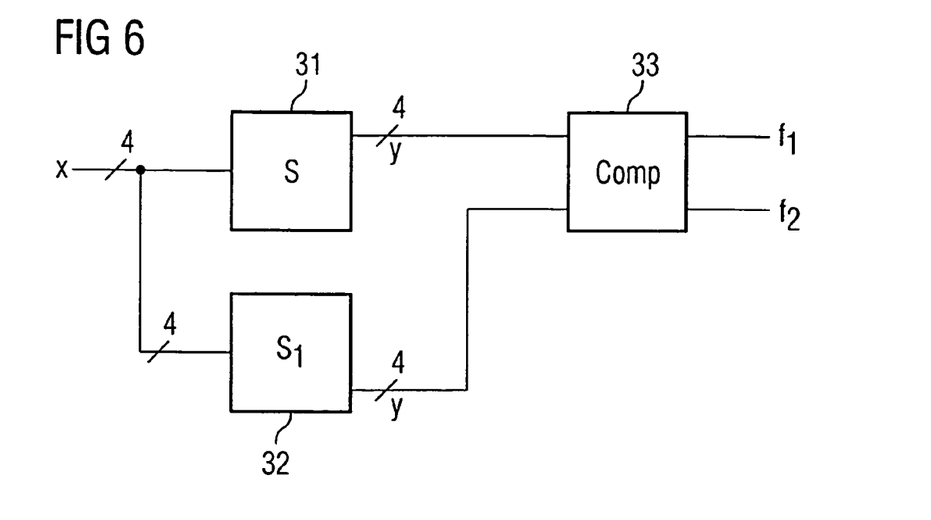
FIG. 6 is a block circuit diagram of a conventional fault detection circuit.

FIG. 6 shows a circuit S 31 having m=4 binary inputs $x=X_1, X_2, X_3, x_4$ and n=4 binary outputs $y=Y_1, Y_2, Y_3, Y_4$, which is duplicated into the circuit $S_1$=S 32 having the m=4 inputs $x=X_1, X_2, X_3, X_4$ and the n=4 outputs $Y=Y_1, Y_2, Y_3, Y_4$. The outputs of the circuits S and $S_1$ are compared in the comparator COMP 33 having 2n=8 inputs and two outputs $f_1$, and $f_2$. If there is no fault, the comparator COMP 33 outputs the values 0,1 or 1,0 at its outputs $f_1, f_2$. If there is a fault in one of the circuits S, $S_2$ or in the comparator COMP 33, the comparator COMP 33 outputs the values 0,0 or 1,1 at its outputs $f_1$ and $f_2$.

There are special features for the fault detection by duplication and comparison for cryptographic circuits serving to transform unencrypted data to encrypted data or to transform encrypted data to unencrypted data. First, as in other circuits as well, technical faults, such as stuck-at faults and other technical faults, are to be detected by duplication and comparison. However, faults are also injected deliberately into cryptographic circuits to be able to draw conclusions as to the method of encryption based on the then faulty outputs of the circuits and to be able to determine, for example, the used cryptographic key. If, for example, two faults of the same kind are injected into the original circuit and into the duplicated circuit, these errors cannot be detected by duplication and comparison. The possibility to inject equal faults into the original circuit and into the duplicated circuit is facilitated if both circuits are constructed in the same way, which is disadvantageous. If a self-checking comparator is used for the comparison of the circuit outputs, which is normally made of a self-checking two-rail checker with inverted inputs, as is known to someone skilled in the art (and is furthermore described, for example, in Wakerly, J. Error Detecting Codes, Self-Checking Circuits and Applications, New York, 1978), a relatively large percentage of the faults injected into the circuit to be monitored cannot be detected by duplication and comparison in a relatively simple manner by simultaneously injecting faults into the comparator and into the circuit to be monitored, which is also disadvantageous. As faults in cryptographic circuits are normally injected stochastically, for example by irradiating the circuit, this results in a relatively high probability that faults in the circuit to be monitored are not detected and the faulty outputs may be analyzed. A completely self-checking comparator is usefully constructed as a completely self-checking two-rail checker with inverted inputs.

Figure 7A:
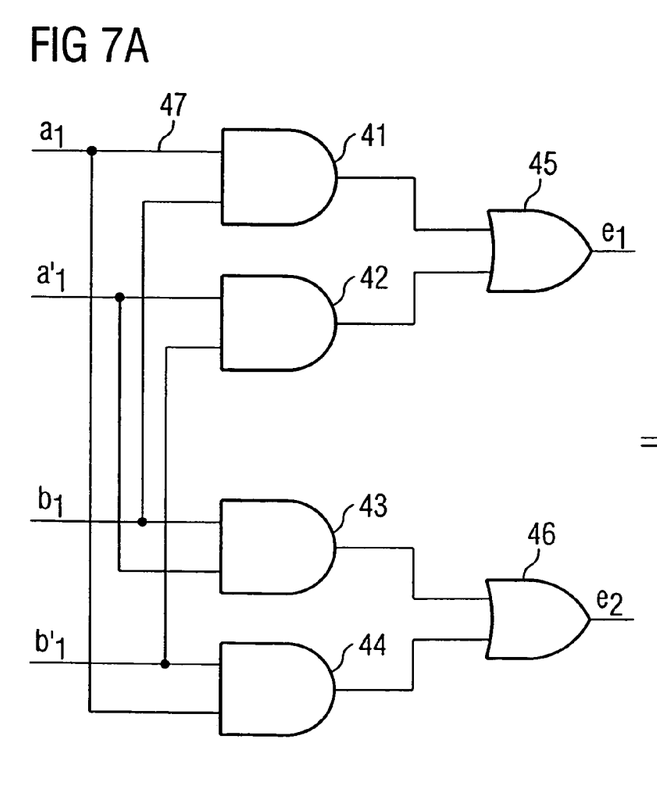
FIG. 7A is a circuit diagram of a conventional completely self-checking two-rail checker structure for detecting faults.
Figure 7B:
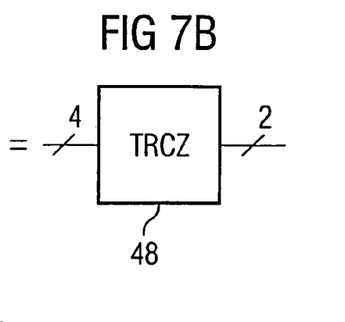
FIG. 7B is a circuit symbol of a two-rail checker cell whose structure is designed according to FIG. 7A.

According to prior art, a completely self-checking two-rail checker is designed as a tree structure of two-rail checker cells TRCZ 48 having four inputs $a_1$, $a'_1$, $b_1$, $b'_1$ and two outputs $e_1$, $e'_1$, as illustrated in FIGS. 7A and 7B, as known to someone skilled in the art, and furthermore illustrated, for example, in Wakerly, J. Error Detecting Codes, Self-Checking Circuits and Applications, New York, 1978. A two-rail checker cell is a two-rail checker having four inputs and two outputs. It consists of four AND gates 41, 42, 43, and 44 and two OR gates 45 and 46 whose outputs $e_1$ and $e'_1$ are the outputs of the two-rail checker cell. Its four inputs are designated $a_1$, $a'_1$, $b_1$, $b'_1$.

If the two-rail checker cell TRCZ of FIG. 7B is faultless, each two-rail input $a_1$, $a'_1$, $b_1$, $b'_1 = a_1$, $\bar{a}_1$, $a_2$, $\bar{a}_2$ always causes a two-rail output $e_1$, $e'_1 = e_1$, $\bar{e}_1$, and each non-two-rail input results in a non-two-rail output $e_1$, $e'_1 = e_1$, $e_1$.

If any input or an output of a gate of the two-rail checker cell TRCZ is "stuck at" 0 or "stuck at" 1, so that a constant value of 0 or 1 is applied to this input and/or output in a faulty way, there is a correct two-rail input so that the output is non-two rail. If, for example, the input line of the AND gate 41 in FIG. 4 marked 47 is "stuck at" 1, the two-rail checker cell TRCZ outputs the value $e_1$, $e'_1 = 1$, 1 for an input of 0, 1, 1, 0, and since the output 1, 1 is non-two rail, the fault is detected.

Figure 8:
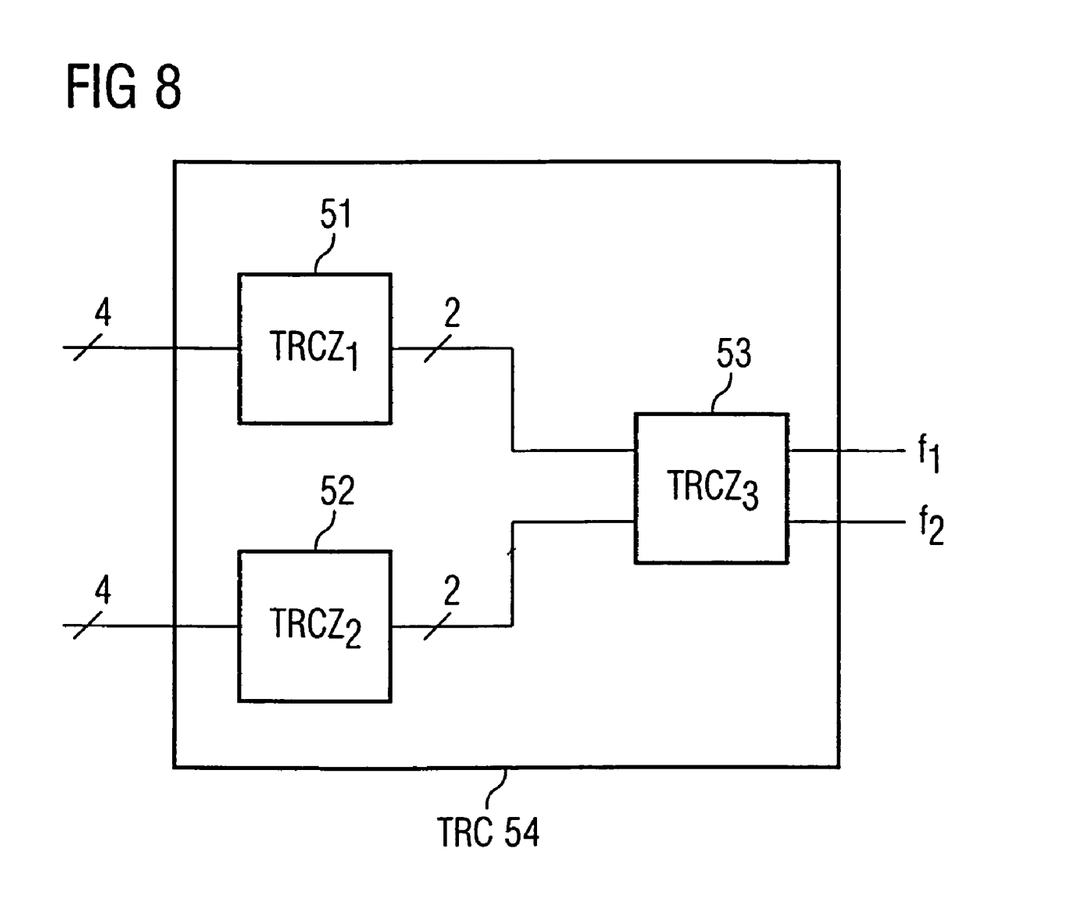
FIG. 8 is a circuit diagram of a completely self-checking two-rail checker.

However, it is noted that, for the input of the faulty input 0, 0, 1, 0, the considered fault "stuck at" 1 and the considered faulty input are not detected, because, for this input, the two-rail checker cell TRCZ outputs the two-rail value 1, 0, so that the faulty input 0, 0, 1, 0 is masked by the "stuck at" 1 fault on the line marked 47 in FIG. 7A. The same fault "stuck at" 1 of the two-rail checker cell of FIG. 7A for example also masks the faulty input 0, 0, 1, 1. A completely self-checking two-rail checker TRC is designed as a tree structure of two-rail checker cells TRCZ, as illustrated in FIG. 8 for a two-rail checker having eight inputs and two outputs $f_1$, and $f_2$ carrying the fault signal. The two-rail checker having eight inputs and two outputs is structured as a tree of the three two-rail checker cells 51, 52 and 53 by directing the outputs of the two-rail checker cells 51 and 52, which are two bits wide each, into the four bit wide input of the two-rail checker cell 53, whose two bit wide output is the output of the two-rail checker 54 carrying the fault signal $f_2$. The two inputs of the two-rail checker cells 51 and 52, which are four bits wide each, form the eight bit wide input of the two-rail checker 54.

If, for example, a fault is deliberately injected into the circuit realizing the two-rail checker, for example into the two-rail checker cell TRCZ 53 which is directly connected to the outputs of the two-rail checker, and simultaneously into the circuit S in FIG. 8, there is a relatively high percentage of faults of the circuits S which have the effect of faults at the inputs of the two-rail checker TRC as non-two-rail signals, but which cannot be detected as errors due to the now simultaneously faulty two-rail checker, which is disadvantageous particularly for cryptographic circuits. The faulty data at the outputs of the circuit S cannot be turned off then and are available for evaluation, for example for the determination of the key of the cryptographic circuit.

Further prior art regarding fault attacks is known from the following fundamental publications:

E. Biham, A. Shamir, "Differential Fault Analysis of Secret Key Cryptosystems", Springer Lecture Notes in Computer Science, vol. 1294, Advances in Cryptology, Proceedings of CRYPTO'97, pp. 513-525, 1997.

SUMMARY OF THE INVENTION

It is the object of the present invention to provide a possibility to provide a cryptographic unit having significantly improved characteristics with respect to the security of the cryptographic unit.

In accordance with a first aspect, the present invention provides a cryptographic unit which, in faultless operation, processes an input signal into an encrypted output signal according to the round-based AES algorithm in a round i of the first to the next to last round of the AES algorithm and outputs the same and, in the case of a fault, does not output any encrypted output signal, having a first processing unit designed to determine an encrypted output signal from the respective input signal in the corresponding round i of the first to the next to last round of the AES algorithm in subcircuits corresponding to the successive operations Subbyte, ShiftRows, MixColumns, AddRoundKey of the AES algorithm, and to process this output signal in a further subcircuit designed to execute an inverse MixColumns operation or a bitwise inverted inverse MixColumns operation to obtain a first comparison signal for the corresponding round i of the AES algorithm, wherein the respective round i is designated by the variable i and a cryptographic key to be used in the i-th round is designated by the variable $k_i$; a second processing unit designed to determine, from the input signal applied to the first processing unit in a round i of the first to the next to last round of the AES algorithm, a second comparison signal for the corresponding round i of the AES algorithm in subcircuits corresponding to the successive operations Subbytes, ShiftRows, and an addition operation of the inverse MixColumns operation of the operation AddRoundKey or a bitwise inverted inverse MixColumns operation of the operation AddRoundKey, wherein, in a faultless operation of the cryptographic unit, the first comparison signal and the second comparison signal are related to each other in a predetermined relationship; and a release unit for providing the output signal, wherein the release unit is designed to perform a defense measure against a tapping of the output signal external to the cryptographic unit, when the first comparison signal is not related to the second comparison signal in the predetermined relationship.

In accordance with a second aspect, the present invention provides a cryptographic unit which, in faultless operation, processes an input signal into a decrypted output signal according to the round-based AES algorithm in a round i of the first to the next to last round of the AES algorithm and outputs the same and does not output any decrypted output signal in the case of a fault, having a first processing unit designed to determine a decrypted output signal from the respective input signal in the corresponding round i of the first to the next to last round of the AES algorithm in subcircuits based on the operations AddRoundKey, inverse MixColumns, inverse ShiftRows, and inverse Subbyte of the AES algorithm, and to process this output signal in a further subcircuit designed to execute a MixColumns operation or a bitwise inverted MixColumns operation to obtain a first comparison signal for the corresponding round i of the AES algorithm, wherein the respective round i is designated by the variable i and a cryptographic key to be used in the i-th round is designated by the variable $k_i$; a second processing unit designed to determine, from the input signal applied to the first processing unit in a round i of the first to the next to last round of the AES algorithm, a second comparison signal for the corresponding round i of the AES algorithm in subcircuits corresponding to an addition operation of the MixColumns operation of the operation AddRoundKey or a bitwise inverted MixColumns operation of the operation AddRoundKey and the operations inverse ShiftRows, inverse Subbytes, wherein, in faultless operation of the cryptographic unit, the first comparison signal and the second comparison signal are related to each other in a predetermined relationship; and a release unit for providing the output signal, wherein the release unit is designed to perform a defense measure against a tapping of the output signal external to the cryptographic unit, when the first comparison signal is not related to the second comparison signal in the predetermined relationship.

In accordance with a third aspect, the present invention provides a method for operating a cryptographic unit in a round i of an encryption method, particularly for the execution of a round i of the AES algorithm, wherein the variable i designates the corresponding round of the encryption method, the method having the steps of providing an input signal; determining an output signal on the basis of an encrypted version of the input signal successively executing the operations Subbytes, ShiftRows, MixColumns and AddRoundKey using a cryptographic key $k_i$ in the execution of the operation AddRoundKey; determining a first comparison signal on the basis of an inverse MixColumns operation of the output signal or a bitwise inverting inverse MixColumns operation of the output signal; calculating a second comparison signal on the basis of the input signal executing the operations Subbytes and ShiftRows and the inverse MixColumns operation of the operation AddRoundKey or the bitwise inverted inverse MixColumns operation of the operation AddRoundKey, wherein, in a faultless operation of the cryptographic unit, the first comparison signal and the second comparison signal are related to each other in a predetermined relationship; comparing the first comparison signal to the second comparison signal to obtain a blocking signal, when the first comparison signal and the second comparison signal are not related to each other in the predetermined relationship; and in response to the blocking signal, taking a defense measure against a tapping of the output signal external to the cryptographic unit.

In accordance with a fourth aspect, the present invention provides a method for operating a cryptographic unit in a round i of a decryption method, particularly for the execution of a round i of the AES algorithm, wherein the variable i designates the corresponding round of the decryption method, the method having the steps of providing an input signal; determining an output signal on the basis of a decrypted version of the input signal successively executing the operations AddRoundKey, inverse MixColumns, inverse ShiftRows and inverse Subbytes using a cryptographic key $k_i$ in the execution of the operation AddRoundKey; determining a first comparison signal on the basis of a MixColumns operation of the output signal or a bitwise inverted MixColumns operation of the output signal; calculating a second comparison signal on the basis of the input signal executing the MixColumns operation of the operation AddRoundKey or the bitwise inverted MixColumns operation of the operation AddRoundKey and the operations inverse ShiftRows and inverse Subbytes, wherein, in a faultless operation of the cryptographic unit, the first comparison signal and the second comparison signal are related to each other in a predetermined relationship; comparing the first comparison signal to the second comparison signal to obtain a blocking signal, when the first comparison signal and the second comparison signal are not related to each other in the predetermined relationship; and in response to the blocking signal, taking a defense measure against a tapping of the output signal external to the cryptographic unit.

In accordance with a fifth aspect, the present invention provides a computer program having program code for performing the first above-mentioned method, when the computer program runs on a computer.

In accordance with a sixth aspect, the present invention provides a computer program having program code for performing the second above-mentioned method, when the computer program runs on a computer.

The present invention provides a cryptographic unit which, in faultless operation, processes an input signal into an encrypted or decrypted output signal according to the round-based AES algorithm in a round i of the first to the next to last round of the AES algorithm and outputs the same and which, in the case of a fault, does not output an encrypted or decrypted output signal, comprising:

a first processing unit designed to determine an encrypted or decrypted output signal from the respective input signal in the corresponding round i of the first to the next to last round of the AES algorithm in subcircuits corresponding to the successive operations Subbyte, ShiftRows, MixColumns, AddRoundKey of the AES algorithm, and to process this output signal in a further subcircuit designed to perform an inverse MixColumns operation or a bitwise inverted inverse MixColumns operation to obtain a first comparison signal for the corresponding round i of the AES algorithm, wherein the respective round i is designated by the variable i and a cryptographic key to be used in the i-th round is designated by the variable $k_i$;

a second processing unit designed to determine, from the input signal applied to the first processing unit in a round i of the first to the next to last round of the AES algorithm, a second comparison signal for the corresponding round i of the AES algorithm in subcircuits corresponding to the successive operations Subbytes, ShiftRows and an addition operation of the inverse MixColumns operation of the operation AddRoundKey or a bitwise inverted inverse MixColumns operation of the operation AddRoundKey, wherein, in faultless operation of the cryptographic unit, the first comparison signal and the second comparison signal are related to each other in a predetermined relationship; and a release unit for providing the output signal, wherein the release unit is designed to perform a defense measure against a tapping of the output signal external to the cryptographic unit, when the first comparison signal is not related to the second comparison signal in the predetermined relationship.

Furthermore, the present invention provides a method for operating a cryptographic unit in a round i of an encryption or decryption method, particularly for the execution of a round i of the AES algorithm, wherein the variable i designates the corresponding round of the encryption or decryption method, comprising:

providing an input signal;

determining an output signal on the basis of an encrypted or decrypted version of the input signal successively executing the operations Subbytes, ShiftRows, MixColumns and AddRoundKey using a cryptographic key $k_i$ in the execution of the operation AddRoundKey;

determining a first comparison signal on the basis of an inverse MixColumns operation of the output signal or a bitwise inverted inverse MixColumns operation of the output signal;

calculating a second comparison signal on the basis of the input signal executing the operations Subbytes and ShiftRows and the inverse MixColumns operation of the operation AddRoundKey or the bitwise inverted inverse MixColumns operation of the operation AddRoundKey, wherein, in faultless operation of the cryptographic unit, the first comparison signal and the second comparison signal are related to each other in a predetermined relationship;

comparing the first comparison signal to the second comparison signal to obtain a blocking signal, when the first comparison signal and the second comparison signal are not related to each other in the predetermined relationship; and in response to the blocking signal, taking a defense measure against a tapping of the output signal external to the cryptographic unit.

The present invention is based on the finding that a significant increase of the fault detection may be realized by employing, in a cryptographic unit, a first and a second processing unit preferably in a separate way, which correspondingly generate a first and a second comparison signal, and wherein the first and the second comparison signal are related to each other in a predetermined relationship in a faultless operation of the cryptographic unit. By generating the first and the second comparison signal in a way which preferably differs, a significantly improved fault detection may be realized than this is possible by merely a simple duplication of structures and thus a like determination of the two comparison signals. If now there is an attempt in a fault attack (for example by irradiating the cryptographic unit) to cause a malfunction by which a key of the cryptographic unit may be spied out, it is now considerably more difficult in such a fault attack to induce a fault having an equal effect on the first and the second processing unit, so that the first and the second comparison signal is disturbed in an equal manner. The fact that the first and the second processing unit differ in the way of the generation of the first and the second comparison signal, respectively, thus enables a significant increase of a fault detection in a cryptographic unit as compared to conventional cryptographic units. Furthermore, the release unit may also use the first and the second comparison signal and, similar to a comparator, protect the output signal against a tapping external to the cryptographic unit, when the first and the second comparison signal are not related to each other in the predetermined relationship (i.e. when a fault attack is likely to have occurred). A particularly efficient protection and/or a very efficient fault detection is further possible when the output signal is also related to the first comparison signal in a predetermined way, for example in the form that the output signal represents an intermediate signal in the processing of the input signal into the first comparison signal. Based on this, it is not only possible to check a probably faultless function of the first processing means; it is also possible to check the output signal itself such that, when a fault and/or an inconsistency between the first comparison signal and the second comparison signal occurs, the output signal is also very likely to be faulty.

The present invention thus has the advantage, as compared to a mere duplication of structures, to offer a significant increase of the fault detection possibility of such cryptographic units also by the different design of these structures. Particularly by the possibility easy to realize from a numerical or hardware-related point of view to calculate back, for example, the linear operation MixColumns of the AES algorithm in the first processing unit to obtain a first comparison signal from the output signal. This first comparison signal can then be compared to a second comparison signal which is calculated from the input signal using a second processing rule different from the first processing unit in a second comparison unit, whereby it is possible to enable the above-mentioned improvement in the fault detection of a cryptographic unit for the calculation of the AES algorithm.

The inventive solution further provides the advantage that there is no reduction of the data throughput (as described above in section a)), and the weaknesses of the identical duplication with comparison, as described in section b), are avoided, i.e. the comparator or the release means is no longer a "single point of failure" in the realization of a fault-proof AES described in the following, and the principle prevents "equal faults" in two data paths from occurring. The hardware-related effort of the solution approximately corresponds to a duplication—but with a significantly higher fault detection probability.

The individual steps of the method for operating a cryptographic unit may also be executed in correspondingly designed means of the cryptographic unit.

In a favorable implementation of the present invention, the cryptographic unit further comprises:

a third processing unit for processing an input signal in the last round l of the AES algorithm, wherein the third processing unit is designed to determine an encrypted or decrypted output signal in subcircuits corresponding to successive operations Subbytes, ShiftRows, AddRoundKey $k_i$ of the AES algorithm, and to process this output signal into a comparison signal for the last round l in a further subcircuit realizing the inverse MixColumn operation, wherein l designates the last round of the AES algorithm and $k_l$, designates a cryptographic key of the last round l;

a fourth processing unit designed to determine, from the input signal applied to the third processing unit in the last round l of the AES algorithm, a second comparison signal for the last round l of the AES algorithm in subcircuits corresponding to the successive operations Subbytes, ShiftRows, the inverse MixColumns operation and an addition operation of the inverse MixColumns operation of the operation AddRoundKey or the bitwise inverted inverse MixColumns operation of the operation AddRoundKey, wherein, in a faultless operation of the cryptographic unit, the first comparison signal and the second comparison signal for the last round l of the AES algorithm are related to each other in a further predetermined relationship; and wherein the release unit for providing the output signal is designed to execute a defense measure against a tapping of the output signal external to the cryptographic unit, when the first comparison signal of the last round l is not related to the second comparison signal of the last round l of the AES algorithm in the further predetermined relationship.

A cryptographic unit designed in such a way offers the advantage of a further increase in the fault detection possibility, because now all rounds of an AES algorithm to be executed may be monitored and there is thus a significant increase in the fault detection capacity.

It is also favorable when the predetermined relationship or the further predetermined relationship consists in that the first comparison signal is bitwise identical to the second comparison signal, because this allows a comparison means which is easy to implement from a hardware-related or numerical point of view.

It may also be advantageously provided to design the predetermined relationship or the further predetermined relationship such that the first comparison signal is bitwise inverse to the second comparison signal, which allows a further increase in security due to the use of an additional complexity in the cryptographic unit which may possibly detect a fault undetected until then in a fault attack.

It is advantageous when the fourth processing unit is designed to execute the inverse MixColumns operation prior to the addition operation, because this allows an increase in the security of the cryptographic unit. This is particularly the result of the fact that the inverse MixColumns operation is to be executed twice, i.e. it is used first for the transformation of the result from the ShiftRows operation and a second time for the transformation of the round key of the corresponding round $k_i$.

In a low-cost implementation of the present invention, the fourth processing unit is designed to execute the inverse MixColumns operation after the addition operation. This offers the advantage to use a structure for the fourth processing unit which corresponds to the structure of the second processing unit and is thus easy to implement.

Furthermore it may be advantageous that, when the AES algorithm includes 10, 12 or 14 rounds, respectively, depending on a key length, the cryptographic unit is designed to use the first and the second processing unit for the processing of the AES algorithm from the first to the next to last round and to use the third and the fourth processing unit for processing the AES algorithm in the last round. This offers the possibility to obtain a sufficiently secure result using messages of a predetermined bit length to be encrypted or decrypted already after 10, 12 or 14 rounds, respectively.

Furthermore, the input signal and the output signal may, for example, each be a bus signal with a plurality of binary signals, wherein the release unit is designed to set each single one of the binary signals of the output signal to a common predetermined signal value or a random-based or pseudo random-based signal value for an access external to the cryptographic unit as a defense measure. This offers the advantage that, when detecting a fault attack, the true output signal actually determined by the cryptographic unit is made unrecognizable and a potential attacker may furthermore be additionally mislead, for example, by the use of random-based or pseudo random-based signal values.

It is also advantageous when the release unit is designed to suppress a supply of a clock signal required for the operation of the cryptographic unit to the cryptographic unit as a defense measure, because this ensures once more that the output signal of the cryptographic unit is definitely protected against an external tapping.

In addition, the release unit may also be designed to use a delay stage when performing a defense measure. This offers the advantage to not directly show an attacker that the fault attack was detected. Combined with the use of the random-based or pseudo random-based signal values as output signal, this may further make the fault analysis of an attacker significantly more difficult, which further increases the security of the cryptographic unit.

Also, the first comparison signal and the second comparison signal may comprise a number of binary subsignals corresponding to a number of binary subsignals of the output signal. This allows to monitor a protection of the individual subsignals of the output signal in a simple way, because, for each subsignal of the output signal, there is a corresponding subsignal of the first or the second comparison signal.

It is particularly advantageous when the release unit is designed to perform an AND operation between each binary subsignal of the first comparison signal and each binary subsignal of the second comparison signal to obtain binary subsignals of a control signal, and wherein the release unit is further designed to perform an AND operation between each binary subsignal of the control signal and each binary subsignal of the output signal to obtain an output signal that may be tapped off externally. This offers the advantage to allow high security of the cryptographic unit by a circuit structure which is logically simple to realize, and thus to be able to ward off a fault attack in a simple manner.

Furthermore, the first processing unit may have a first hardware-related structure and the second processing unit may have a second hardware-related structure, wherein the first hardware-related structure differs from the second hardware-related structure. This offers the advantage that a different effect of a fault attack on the two processing means may be realized also by the different hardware structure of the first and the second processing unit, which allows a further increase in the security of the cryptographic unit.

Particularly when the first hardware-related structure is implemented in a bipolar technology and the second hardware-related structure is implemented in a CMOS technology or the first hardware-related structure is implemented in a CMOS technology and the second hardware-related structure is implemented in a bipolar technology, special advantages may be achieved, because the effect of an irradiation provides considerably different fault results in both technologies, which further helps to easily detect a fault attack.

Furthermore, a conductive trace width or a size of a transistor in the first hardware-related structure may be different from a conductive trace width or a size of a transistor in the second hardware-related structure. This is also advantageous for the detection of a fault in an irradiation attack, because the "tilting" of a bit may depend on a width of a conductive trace or a size of a transistor.

Preferably, a structure of the subcircuit realizing the Subbytes operation of the first processing unit may also differ from a structure of a subcircuit realizing the Subbytes operation of the second processing unit, or a processing rule of the Subbytes operation of the first processing unit may differ from a processing rule of the Subbytes operation of the second processing unit. This offers the advantage that not only the MixColumns operation and/or the inverted MixColumns operation may be used to allow a maximum number of faults and thus a very likely detection of faults, but to use also the Subbytes operation due its property for the transformation of one bit faults into multiple bit faults.

Particularly when the Subbyte operation of the second processing unit differs from the Subbytes operation of the first processing unit in a different implementation of an inversion in a Galois field, special advantages may be realized in the transformation, because such a difference is very likely to transform a single injected fault into a multiple bit fault.

BRIEF DESCRIPTION OF THE DRAWINGS

Some embodiments of the present invention will be explained in more detail in the following with respect to the accompanying drawings, in which.

DESCRIPTION OF THE PREFERRED EMBODIMENTS

In the following description of the figures, equal or similar elements are referred to by equal or similar reference numerals, a repeated description of these elements being omitted.

Initially it is to be noted that the encryption of the data by the AES algorithm is performed in a predetermined number of successive rounds depending on the key length, which are consecutively numbered. Thus, the number of the rounds in the AES is, for example, 10, 12 or 14, respectively (with the numbers 1 to 10, 12 or 14, respectively), depending on a key length of 128, 196 or 256 bits, respectively. In the rounds 1 to the next to last round, there are performed the operations SubBytes in S-boxes, ShiftRow, MixColumns and AddKey (or AddRoundKey), in the last round the operation MixColumns is omitted. If, for example, we assume a word width of n=128 bits, the operation SubBytes is realized by 16 S-boxes each having an input word width of 8 bits and an output word width of 8 bits. The operation ShiftRow is realized by a permutation. In the operation AddKey, a 128 bit wide key $k_i = k_{i,1}, \ldots, k_{i, 128}$ is combined component-wise with the n=128 outputs of the operation MixColumns. The operation MixColumns is a uniquely reversible linear transform which, in four groups, transforms 32 bits wide inputs into 32 bits wide outputs. As the operation is a reversible linear transform, it is designated here with the symbol L, and its inverse operation (InversMixColumns) is designated with the symbol $L^{-1}$. The AES algorithm and its implementation are known to those skilled in the art in principle. Furthermore, it is described in Daemen, J. and V. Rijmen, "AES proposal Rijndanel" http://www.esat. kuleuven.ac.be/rjmen/rijndael/rijndaeldocV2.zip.

Figure 1:
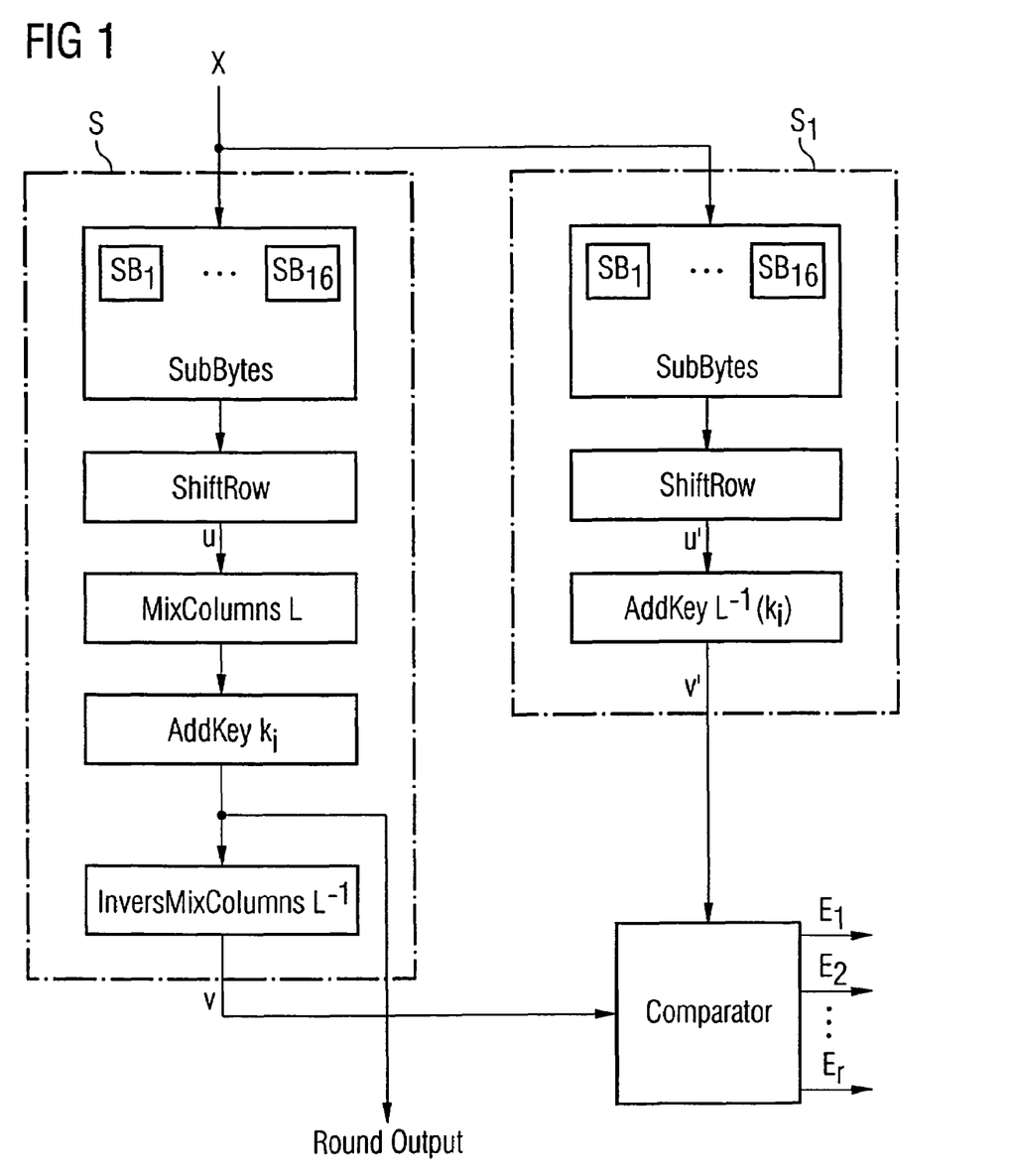
FIG. 1 is a block diagram of a first embodiment of the present invention.

FIG. 1 shows a first inventive implementation of a fault detection circuit for the AES algorithm for the rounds 1 to the next to last round.

It may be appreciated that, in FIG. 1, a first comparison signal v is compared to a second comparison signal v' by a comparator, wherein the comparison signals are provided by structurally different circuits S (first processing unit) and $S_1$, (second processing unit). The first circuit (first processing unit) includes the operations SubBytes, ShiftRow, MixColumns, AddKey $k_i$ and Invers MixColumns L. The second circuit (second processing unit) includes the operations SubBytes, ShiftRow and AddKey $L^{-1}$ ($k_i$). Due to the different structural design of the circuits and/or the different numerical processing rule (exchange of different processing blocks), whose outputs are compared, the injection of equal faults into these two circuits is made more difficult. Furthermore, a qualified designer will realize these circuits in a diverse way, for example in a different device base, to make the injection of equal faults into the circuit S and Sl virtually impossible. On the one hand, this different device base may be a different fabrication technology, such as the CMOS (complementary metal oxide semiconductor) or bipolar technology. Furthermore, there may also be used different conductive trace widths or different sizes of devices, such as transistors, to cause a different effect of fault attacks on the two processing units. The comparator outputs r, r >1, fault signals which may be used for turning off the signal "round output".

Figure 2:
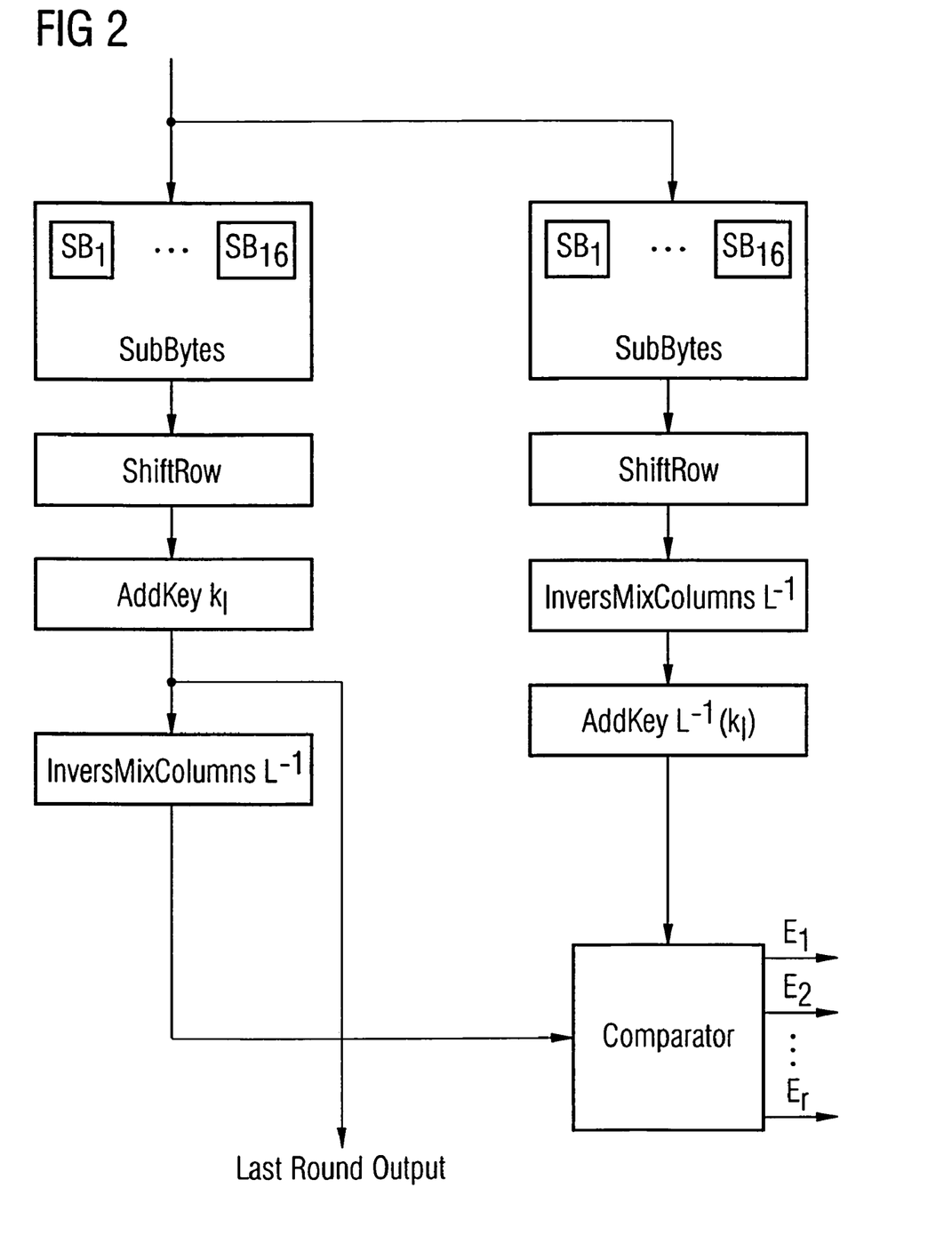
FIG. 2 is a block diagram of an extension of the first embodiment of the present invention for the last round of the AES algorithm.

FIG. 2 shows an extension of the embodiment of a fault detection circuit for the AES algorithm illustrated in FIG. 1 for the last round. By omitting the MixColumns operation of the AES algorithm in the last round, the structure of FIG. 1 is slightly changed by now inserting an inverse MixColumns operation $L^{-1}$ in the second processing unit, wherein this inverse MixColumns operation may be executed either immediately after the ShiftRows operation (as illustrated in FIG. 2) or after an addition operation of an inverse MixColumns operation of the AddKey operation (not illustrated in FIG. 2).

Figure 3:
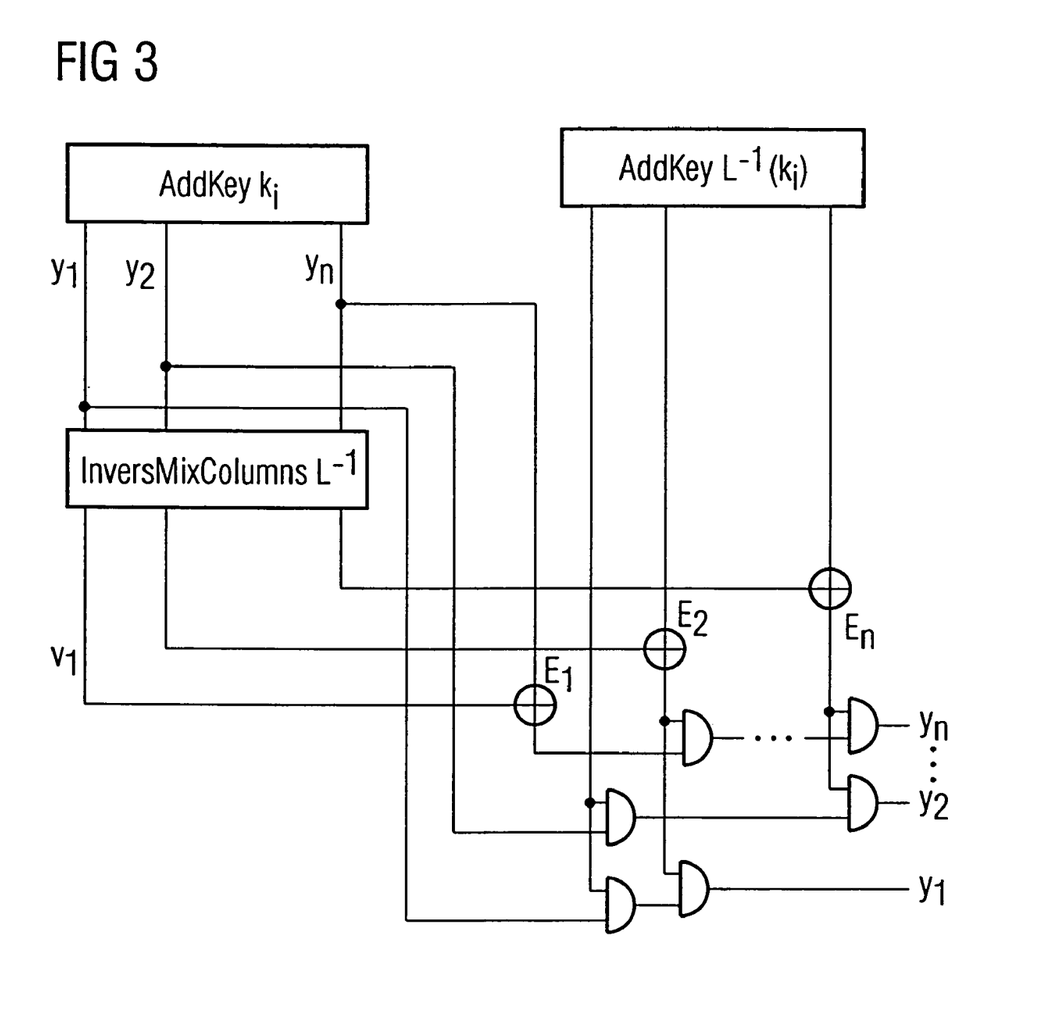
FIG. 3 is a block diagram of a comparator that may be used.

FIG. 3 shows a possible extension of the comparator of a cryptographic unit for the AES algorithm illustrated in FIGS. 1 and 2, wherein this extension illustrated in FIG. 3 then represents an embodiment of a release unit. The outputs of the XOR gates (EXCLUSIVE OR gates) shown in FIGS. 1 and 2 which realize the comparison between the first comparison signal v and the second comparison signal v' are the input signals of the comparator.

It is noted that each faulty output signal $E_1, \ldots, E_r$ of the comparator, which here, according to FIG. 3, simply consists of n XOR gates connected to each other, switches the output of the circuit S (i.e. the output signal y with the binary subsignals $Y_i, \ldots, Y_n$) completely to the value 0 by a connection with AND gates according to the circuit structure of FIG. 3. In another implementation, the release unit may also be designed to set the binary subsignals of the output signals to a random or pseudo random signal value, in order to not inform an attacker directly that the attack has been detected.

The following will describe the encryption according to an AES algorithm. The corresponding decryption obviously follows the same scheme.

Figure 4:
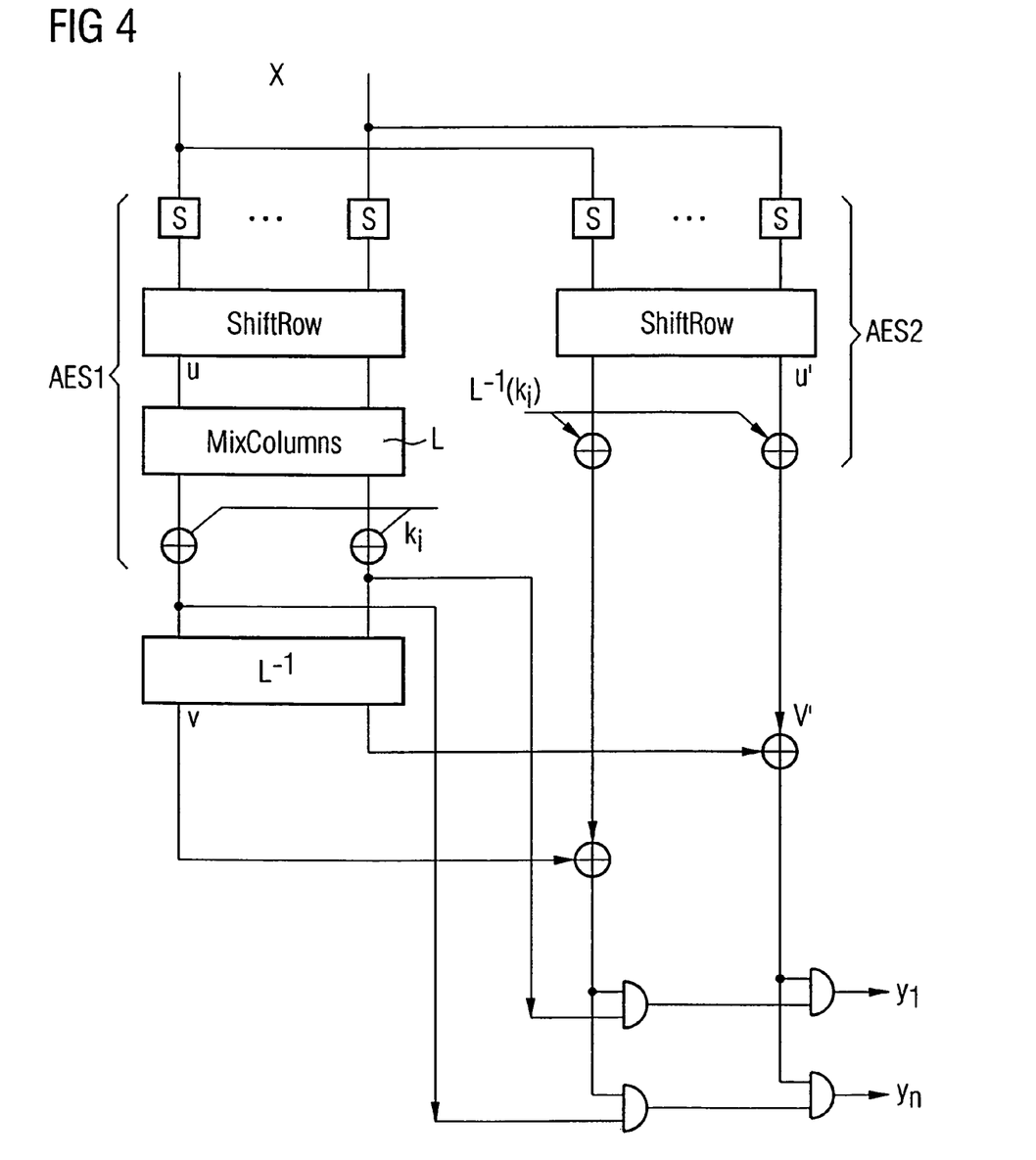
FIG. 4 is a block diagram of a further embodiment of the present invention.

The AES algorithm is essentially duplicated (AES1 on the left-hand side and AES2 on the right-hand side), as illustrated in the embodiment shown in FIG. 4, but with some important modifications.

In the first processing unit AES1, the inverse operation $L^{-1}$ of the linear transform L="MixColumn" is executed after the operation AddKey (+$k_i$). In the second processing unit AES2, the AES algorithm is slightly modified and reduced: "MixColumn" is omitted, and "Addkey" (+$k_i$) is substituted by the transform $L^{-1}$ ($k_i$), wherein $k_i$ represents the round key in the i-th round. The results from AES1 after $L^{-1}$ and from the reduced AES2 after $L^{-1}$ ($k_i$) are compared, i.e. are added bitwise modulo 2. Each of these 128 comparison results turns off each of the outputs $Y_i, Y_2, \ldots, Y_{128}$ in the case of an inequality, otherwise the result of AES1 (prior to L) is output. The turning off may also generate a fault signal (not illustrated) which signals the fault case to a control processor or the control software.

AES2 is realized in a diverse manner with respect to AES1, so that there are no more identical nodes in the respective circuits. This may be realized in various ways, for example by implementing the S-boxes in a different manner than in AES1 (for example as ROM (read only memory), inversion in the Galois field according to different methods).

The linear transform, which is downstream in AES1, has the property to transform one bit faults very efficiently into multiple bit faults, so that the simultaneous injecting of faults canceling each other into AES1 and AES2 is made significantly more difficult.

In this context it is to be noted that, in the embodiment illustrated in FIG. 4, the following relationships $$v = L^{-1}(k_i \oplus L(u)) = L^{-1}(k_i) \oplus u \text{ and}$$

$$v' = u \oplus L^{-1}(k_i) \rightarrow v = v' \text{ for } u = u'$$

were considered in particular, wherein the symbol ⊕ represents an addition (which may also be realized as binary EXCLUSIVE OR operation), v represents the comparison signal of the first processing unit S, v' represents the comparison signal of the second processing unit $S_1$, L represents the MixColumns operation, $L^{-1}$ represents the inverse MixColumns operation, $k_i$ represents the round key for the i-th round, u represents the result signal of the ShiftRows operation of the first processing unit S, and u' represents the result signal of the ShiftRows operation of the second processing unit $S_1$. It becomes apparent that, in the first embodiment, the linearity of the MixColumns operation is used to reach the same result in two different ways of calculation, when the cryptographic unit operates faultlessly.

Figure 5:
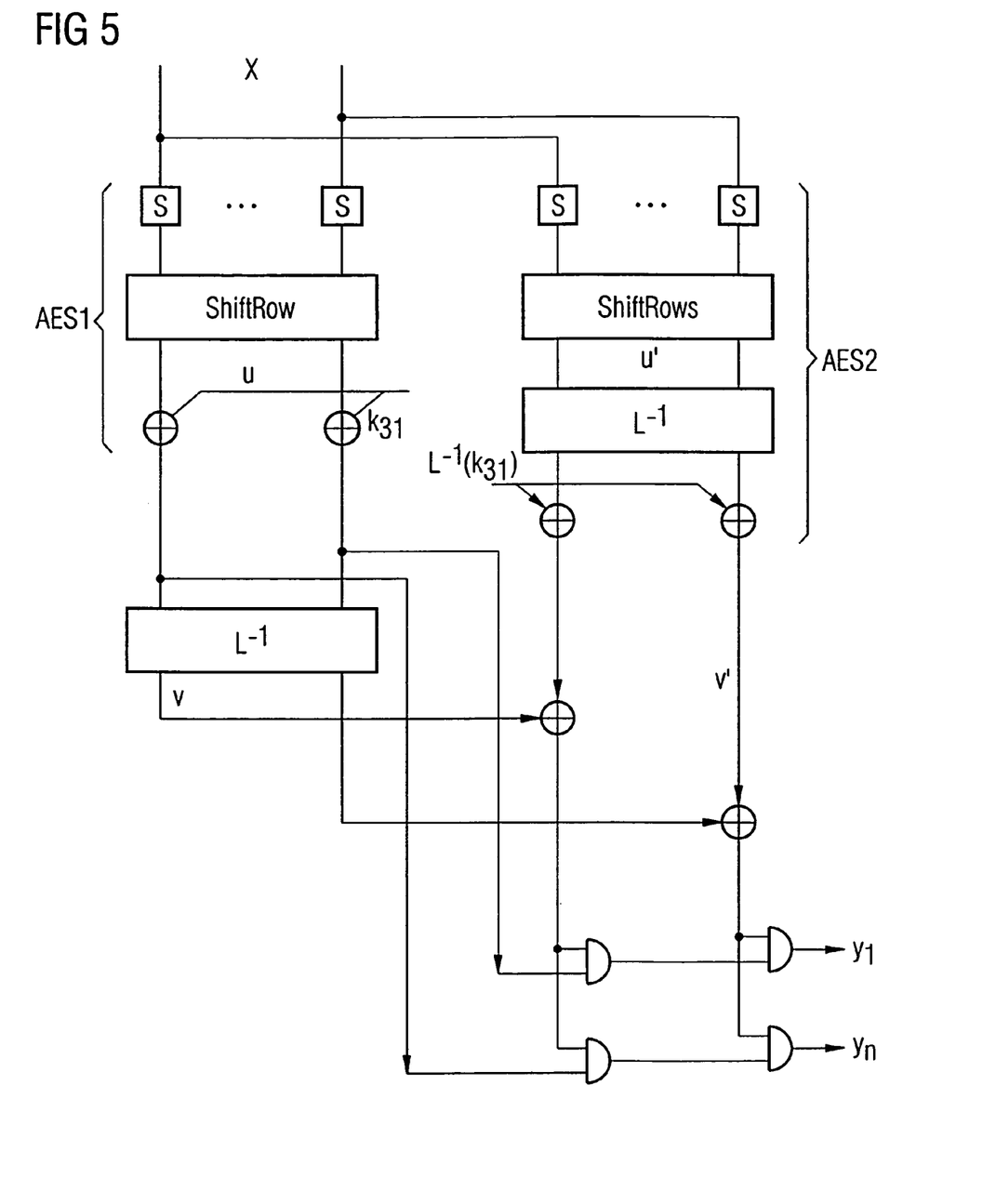
FIG. 5 is a block circuit diagram of an extension of the further embodiment of the present invention according to FIG. 4.

The implementation of the last round differs from the other rounds according to the AES specification. The corresponding modification for the fault detection is illustrated in FIG. 5. Here, there may again be used the linearity of the MixColumns operation which may be represented in more detail by the following formulae:

$$v = L^{-1}(u \oplus k_l) = L^{-1}(u) \oplus L^{-1}(k_l)$$

$$V' = L^{-1}(u) \oplus L^{-1}(k_l)$$

$$\rightarrow v' = v \text{ for } u = u$$

The variables in the above formula are identical to the variables with respect to the formula for FIG. 4; however, $k_l$ now represents the round key of the last round of the AES algorithm. This also has the result again that, in a faultless operation of the cryptographic unit, the first comparison signal and the second comparison signal are identical, from which the faultless operation of the cryptographic unit may be detected.

It is further to be noted that, in the second or the fourth processing unit, there may also be generated a comparison signal corresponding to the bitwise inverted comparison signal of the first processing unit. This bitwise inverted comparison signal may be performed by inverting each single bit of the comparison signal of the second or the fourth processing unit, wherein in that case the comparator also has to be designed correspondingly.

With respect to a decryption it is to be noted that it is based on a reversal of the corresponding order and a use of inverse operations of the operations used in encrypting. Specifically, instead of the use of the operations SubBytes, ShiftRows, MixColumns and AddKey, there are used the operations AddKey, inverse MixColumns, inverse ShiftRows and inverse SubBytes. The design of the second processing unit is then done analogously, i.e. that, when using an inverse MixColumns operation in the first processing unit, the MixColumns operation is used in the second processing unit or vice versa. However, the detailed design of the cryptographic unit is known to someone skilled in the art from the knowledge of the presented approach.

Depending on the circumstances, the inventive method for operating a cryptographic unit may be implemented in hardware or in software. The implementation may be done on a digital storage medium, particularly a floppy disk or CD having control signals that may be read out electronically, which may cooperate with a programmable computer system so that the corresponding method is executed. Generally, the invention thus also consists in a computer program product with a program code for performing the inventive method which is stored on a machine-readable carrier, when the computer program product runs on a computer. In other words, the invention may thus be realized as a computer program having a program code for performing the method, when the computer program runs on a computer.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A cryptographic unit which, in faultless operation, processes an input signal into an encrypted output signal according to the round-based advanced encryption standard (AES) algorithm in a round i of the first to the next to last round of the AES algorithm and outputs the same and, in the case of a fault, does not output any encrypted output signal, comprising:

a first processing unit designed to determine an encrypted output signal from the respective input signal in the corresponding round i of the first to the next to last round of the AES algorithm in subcircuits corresponding to the successive operations Subbyte, ShiftRows, MixColumns, AddRoundKey of the AES algorithm, and to process this output signal in a further subcircuit designed to execute an inverse MixColunms operation or a bitwise inverted inverse MixColumns operation to obtain a first comparison signal for the corresponding round i of the AES algorithm, wherein the respective round i is designated by the variable i and a cryptographic key to be used in the i-th round is designated by the variable $k_i$;

a second processing unit designed to determine, from the input signal applied to the first processing unit in a round i of the first to the next to last round of the AES algorithm, a second comparison signal for the corresponding round i of the AES algorithm in subcircuits corresponding to the successive operations Subbytes, ShiftRows, and an addition operation of the inverse MixColumns operation of the operation AddRoundKey or a bitwise inverted inverse MixColumns operation of the operation, AddRoundKey, wherein, in a faultless operation of the cryptographic unit, the first comparison signal and the second comparison signal are related to each other in a predetermined relationship; and a release unit for providing the output signal, wherein the release unit is designed to perform a defense measure against a tapping of the output signal external to the cryptographic unit, when the first comparison signal is not related to the second comparison signal in the predetermined relationship.

2. The cryptographic unit according to claim 1, further comprising:

a third processing unit for processing an input signal in the last round l of the AES algorithm, wherein the third processing unit is designed to determine an encrypted output signal in subcircuits corresponding to successive operations Subbytes, ShiftRows, AddRoundKey of the AES algorithm, and to process this output signal into a comparison signal for the last round l in a further subcircuit realizing the inverse MixColumn operation, wherein 1 designates the last round of the AES algorithm and $k_j$, designates the key of the last round 1;

a fourth processing unit designed to determine, from the input signal applied to the third processing unit in the last round 1 of the AES algorithm, a second comparison signal for the last round 1 of the AES algorithm in subcircuits corresponding to the successive operations Subbytes, ShiftRows, the inverse MixColumns operation and an addition operation of the inverse MixColumns operation of the operation AddRoundKey or the bitwise inverted inverse MixColumns operation of the operation AddRoundKey, wherein, in a faultless operation of the cryptographic unit, the first comparison signal and the second comparison signal for the last round 1 of the AES algorithm are related to each other in a further predetermined relationship; and wherein the release unit for providing the output signal is designed to perform a defense measure against a tapping of the output signal external to the cryptographic unit, when the first comparison signal of the last round 1 is not related to the second comparison signal of the last round 1 of the AES algorithm in the further predetermined relationship.

3. The cryptographic unit according to claim 1, wherein the predetermined relationship or the further predetermined relationship consists in that the first comparison signal is bitwise identical to the second comparison signal.

4. The cryptographic unit according to claim 1, wherein the predetermined relationship or the further predetermined relationship consists in that the first comparison signal is bitwise inverse to the second comparison signal.

5. The cryptographic unit according to claim 2, wherein the fourth processing unit is designed to execute the inverse MixColumns operation prior to the addition operation.

6. The cryptographic unit according to claim 2, wherein the fourth processing unit is designed to execute the inverse MixColumns operation after the addition operation.

7. The cryptographic unit according to claim 1, further comprising a third processing unit for processing an input signal in the last round 1 of the AES algorithm, wherein the third processing unit is designed to determine an encrypted output signal in subcircuits corresponding to successive operations Subbytes, ShiftRows, AddRoundKey of the AES algorithm, and to process this output signal into a comparison signal for the last round 1 in a further subcircuit realizing the inverse MixColunm operation, wherein 1 designates the last round of the AES algorithm and k, designates the key of the last round 1; a fourth processing unit designed to determine, from the input signal applied to the third processing unit in the last round 1 of the AES algorithm, a second comparison signal for the last round 1 of the AES algorithm in subcircuits corresponding to the successive operations Subbytes, ShiftRows, the inverse MixColumns operation and an addition operation of the inverse MixColumns operation of the operation AddRoundKey or the bitwise inverted inverse MixColumns operation of the operation AddRoundKey, wherein, in a faultless operation of the cryptographic unit, the first comparison signal and the second comparison signal for the last round 1 of the AES algorithm are related to each other in a further predetermined relationship; and wherein the release unit for providing the output signal is designed to perform a defense measure against a tapping of the output signal external to the cryptographic unit, when the first comparison signal of the last round 1 is not related to the second comparison signal of the last round 1 of the AES algorithm in the further predetermined relationship; and wherein the AES algorithm includes 10, 12 or 14 rounds, wherein the cryptographic unit is designed to use the first and the second processing unit for processing the AES algorithm from the first to the next to last round, and to use the third and the fourth processing unit for processing the AES algorithm in the last round.

8. The cryptographic unit according to claim 1, wherein the input signal and the output signal is each a bus signal with a plurality of binary signals, wherein the release unit is designed to set each single one of the binary signals of the output signal to a common predefined signal value or a random-based or pseudo random-based signal value for an access external to the cryptographic unit as defense measure.

9. The cryptographic unit according to claim 1, wherein the release unit is designed to suppress a supply of a clock signal required for the operation of the cryptographic unit to the cryptographic unit as defense measure.

10. The cryptographic unit according to claim 1, wherein the release unit is designed to use a delay stage when performing a defense measure.

11. The cryptographic unit according to claim 1, wherein the first comparison signal and the second comparison signal comprises a number of binary subsignals corresponding to a number of binary subsignals of the output signal.

12. The cryptographic unit according to claim 11, wherein the input signal and the output signal is each a bus signal with a plurality of binary signals, wherein the release unit is designed to set each single one of the binary signals of the output signal to a common predefined signal value or a random-based or pseudo random-based signal value for an access external to the cryptographic unit as defense measure, wherein the release unit is designed to perform an AND operation between each binary subsignal of the first comparison signal and each binary subsignal of the second comparison signal to obtain binary subsignals of a control signal, and wherein the release unit is further designed to perform an AND operation between each binary subsignal of the control signal and each binary subsignal of the output signal to obtain an output signal that may be tapped off externally.

13. The cryptographic unit according to claim 1, wherein the first processing unit has a first hardware-related structure, and wherein the second processing unit has a second hardware-related structure, wherein the first hardware-related structure differs from the second hardware-related structure.

14. The cryptographic unit according to claim 13, wherein the first hardware-related structure is implemented in a bipolar technology and the second hardware-related structure is implemented in a complementary metal oxide semiconductor (CMOS) technology, or the first hardware-related structure is implemented in a CMOS technology and the second hardware-related structure is implemented in a bipolar technology.

15. The cryptographic unit according to claim 13, wherein a conductive trace width or a size of a transistor in the first hardware-related structure differs from a conductive trace width or a size of a transistor in the second hardware-related structure.

16. The cryptographic unit according to claim 1, wherein a structure of a subcircuit realizing the Subbytes operation of the first processing unit differs from a structure of a subcircuit realizing the Subbytes operation of the second processing unit, or wherein a processing rule of the Subbyte operation of the first processing unit differs from a processing rule of the Subbytes operation of the second processing unit.

17. The cryptographic unit according to claim 16, wherein the Subbyte operation of the second processing unit differs from the Subbytes operation of the first processing unit in a different implementation of an inversion in a Galois field.

18. A cryptographic unit which, in faultless operation, processes an input signal into a decrypted output signal according to the round-based advanced encryption standard (AES) algorithm in a round i of the first to the next to last round of the AES algorithm and outputs the same and does not output any decrypted output signal in the case of a fault, comprising:

a first processing unit designed to determine a decrypted output signal from the respective input signal in the corresponding round i of the first to the next to last round of the AES algorithm in subcircuits based on the operations AddRoundKey, inverse MixColumns, inverse ShiftRows, and inverse Subbyte of the AES algorithm, and to process this output signal in a further subcircuit designed to execute a MixColumns operation or a bitwise inverted MixColumns operation to obtain a first comparison signal for the corresponding round i of the AES algorithm, wherein the respective round i is designated by the variable i and a cryptographic key to be used in the i-th round is designated by the variable $k_i$;

a second processing unit designed to determine, from the input signal applied to the first processing unit in a round i of the first to the next to last round of the AES algorithm, a second comparison signal for the corresponding round i of the AES algorithm in subcircuits corresponding to an addition operation of the MixColumns operation of the operation AddRoundKey or a bitwise inverted MixColumns operation of the operation AddRoundKey and the operations inverse ShiftRows, inverse Subbytes, wherein, in faultless operation of the cryptographic unit, the first comparison signal and the second comparison signal are related to each other in a predetermined relationship; and a release unit for providing the output signal, wherein the release unit is designed to perform a defense measure against a tapping of the output signal external to the cryptographic unit, when the first comparison signal is not related to the second comparison signal in the predetermined relationship.

19. A method for operating a cryptographic unit in a round i of an encryption method, particularly for the execution of a round i of the advanced encryption standard (AES) algorithm, wherein the variable i designates the corresponding round of the encryption method, comprising:

providing an input signal;

determining an output signal on the basis of an encrypted version of the input signal successively executing the operations Subbytes, ShiftRows, MixColumns and AddRoundKey using a cryptographic key $k_i$ in the execution of the operation AddRoundKey;

determining a first comparison signal on the basis of an inverse MixColumns operation of the output signal or a bitwise inverting inverse MixColumns operation of the output signal;

calculating a second comparison signal on the basis of the input signal executing the operations Subbytes and ShiftRows and the inverse MixColumns operation of the operation AddRoundKey or the bitwise inverted inverse MixColumns operation of the operation AddRoundKey, wherein, in a faultless operation of the cryptographic unit, the first comparison signal and the second comparison signal are related to each other in a predetermined relationship;

comparing the first comparison signal to the second comparison signal to obtain a blocking signal, when the first comparison signal and the second comparison signal are not related to each other in the predetermined relationship; and in response to the blocking signal, taking a defense measure against a tapping of the output signal external to the cryptographic unit.

20. A method for operating a cryptographic unit in a round i of a decryption method, particularly for the execution of a round i of the advanced encryption standard (AES) algorithm, wherein the variable i designates the corresponding round of the decryption method, comprising:

providing an input signal;

determining an output signal on the basis of a decrypted version of the input signal successively executing the operations AddRoundKey, inverse MixColumns, inverse ShiftRows and inverse Subbytes using a cryptographic key $k_i$ in the execution of the operation AddRoundKey;

determining a first comparison signal on the basis of a MixColumns operation of the output signal or a bitwise inverted MixColumns operation of the output signal;

calculating a second comparison signal on the basis of the input signal executing the MixColumns operation of the operation AddRoundKey or the bitwise inverted MixColumns operation of the operation AddRoundKey and the operations inverse ShiftRows and inverse Subbytes, wherein, in a faultless operation of the cryptographic unit, the first comparison signal and the second comparison signal are related to each other in a predetermined relationship;

comparing the first comparison signal to the second comparison signal to obtain a blocking signal, when the first comparison signal and the second comparison signal are not related to each other in the predetermined relationship; and in response to the blocking signal, taking a defense measure against a tapping of the output signal external to the cryptographic unit.

21. A digital storage medium having stored thereon a computer program having program code for performing the method for operating a cryptographic unit in a round i of an encryption method, particularly for the execution of a round i of the advanced encryption standard (AES) algorithm, wherein the variable i designates the corresponding round of the encryption method, when the computer program runs on a computer, the method comprising:

providing an input signal;

determining an output signal on the basis of an encrypted version of the input signal successively executing the operations Subbytes, ShiftRows, MixColumns and AddRoundKey using a cryptographic key $k_i$ in the execution of the operation AddRoundKey;

determining a first comparison signal on the basis of an inverse MixColumns operation of the output signal or a bitwise inverting inverse MixColumns operation of the output signal;

calculating a second comparison signal on the basis of the input signal executing the operations Subbytes and ShiftRows and the inverse MixColunms operation of the operation AddRoundKey or the bitwise inverted inverse MixColumns operation of the operation AddRoundKey, wherein, in a faultless operation of the cryptographic unit, the first comparison signal and the second comparison signal are related to each other in a predetermined relationship;

comparing the first comparison signal to the second comparison signal to obtain a blocking signal, when the first comparison signal and the second comparison signal are not related to each other in the predetermined relationship; and in response to the blocking signal, taking a defense measure against a tapping of the output signal external to the cryptographic unit.

22. A digital storage medium having stored thereon a computer program having program code for performing the method for operating a cryptographic unit in a round i of a decryption method, particularly for the execution of a round i of the advanced encryption standard (AES) algorithm, wherein the variable i designates the corresponding round of the decryption method, when the computer program runs on a computer, the method comprising:

provide an input signal;

determining an output signal on the basis of a decrypted version of the input signal successively executing the operations AddRoundKey, inverse MixColumns, inverse ShiftRows and inverse Subbytes using a cryptographic key $k_i$ in the execution of the operation AddRoundKey;

determining a first comparison signal on the basis of a MixColumns operation of the output signal or a bitwise inverted MixColunins operation of the output signal;

calculating a second comparison signal on the basis of the input signal executing the MixColumns operation of the operation AddRoundKey or the bitwise inverted MixColumns operation of the operation AddRoundKey and the operations inverse ShiftRows and inverse Subbytes, wherein, in a faultless operation of the cryptographic unit, the first comparison signal and the second comparison signal are related to each other in a predetermined relationship;

comparing the first comparison signal to the second comparison signal to obtain a blocking signal, when the first comparison signal and the second comparison signal are not related to each other in the predetermined relationship; and in response to the blocking signal, taking a defense measure against a tapping of the output signal external to the cryptographic unit.

\* \* \* \* \*